March 2, 1943.  J. H. LEWIS  2,312,564
APPARATUS FOR THE MANUFACTURE OF SHEET GLASS
Filed Sept. 28, 1937   5 Sheets-Sheet 5
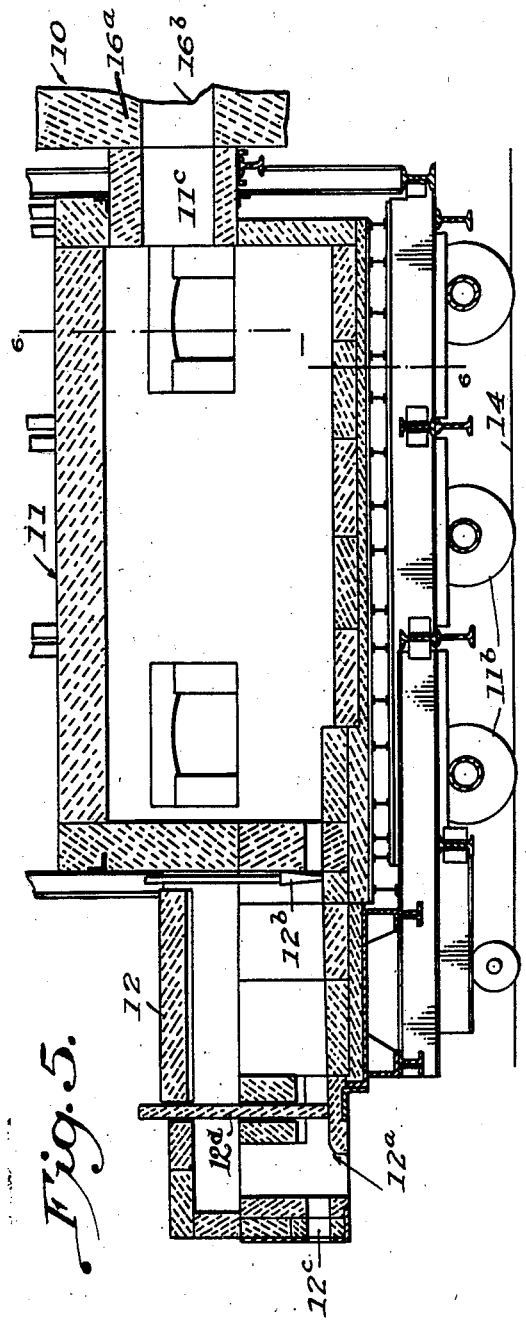
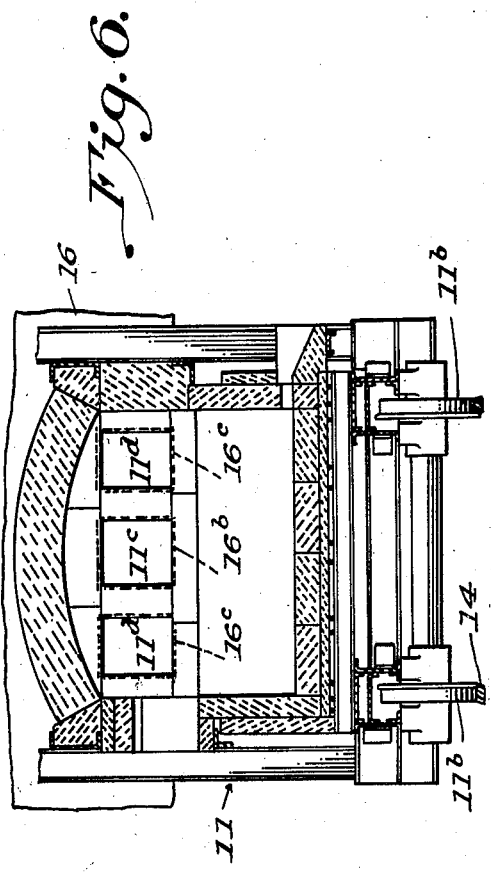

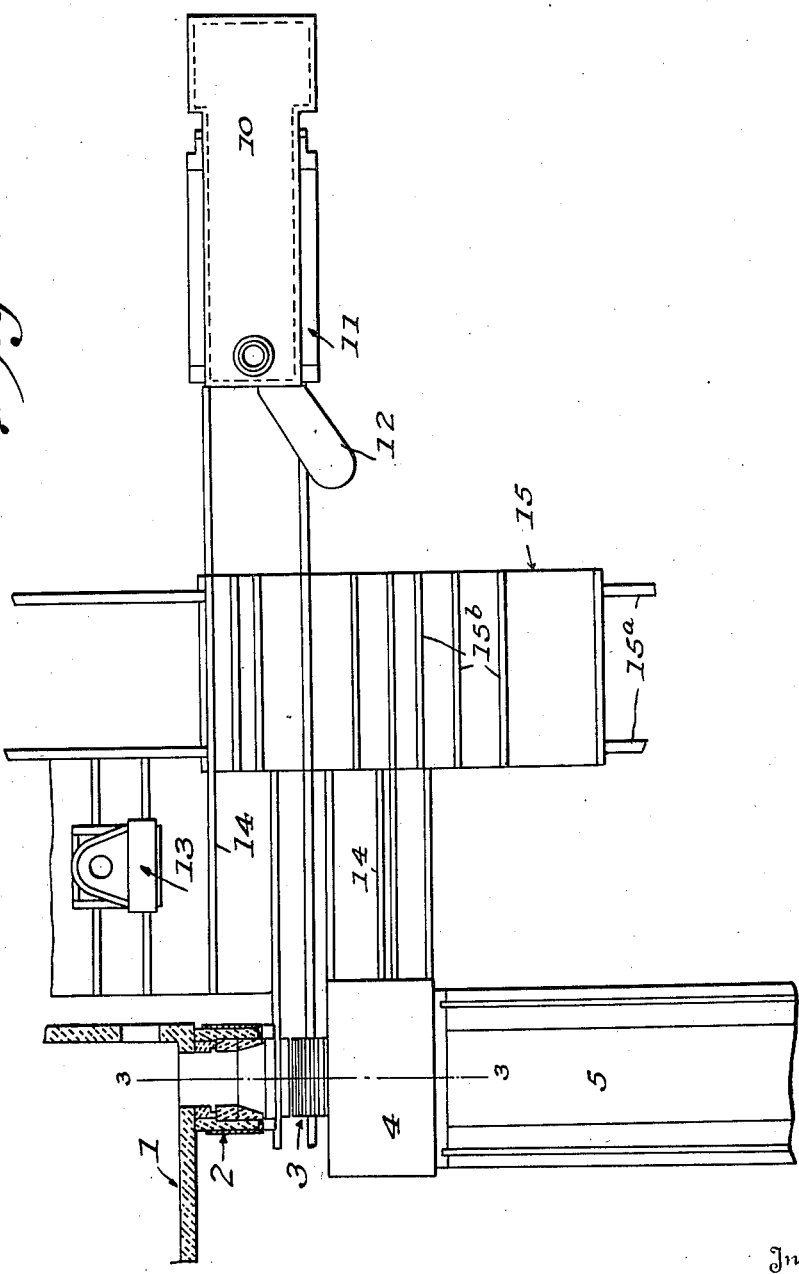

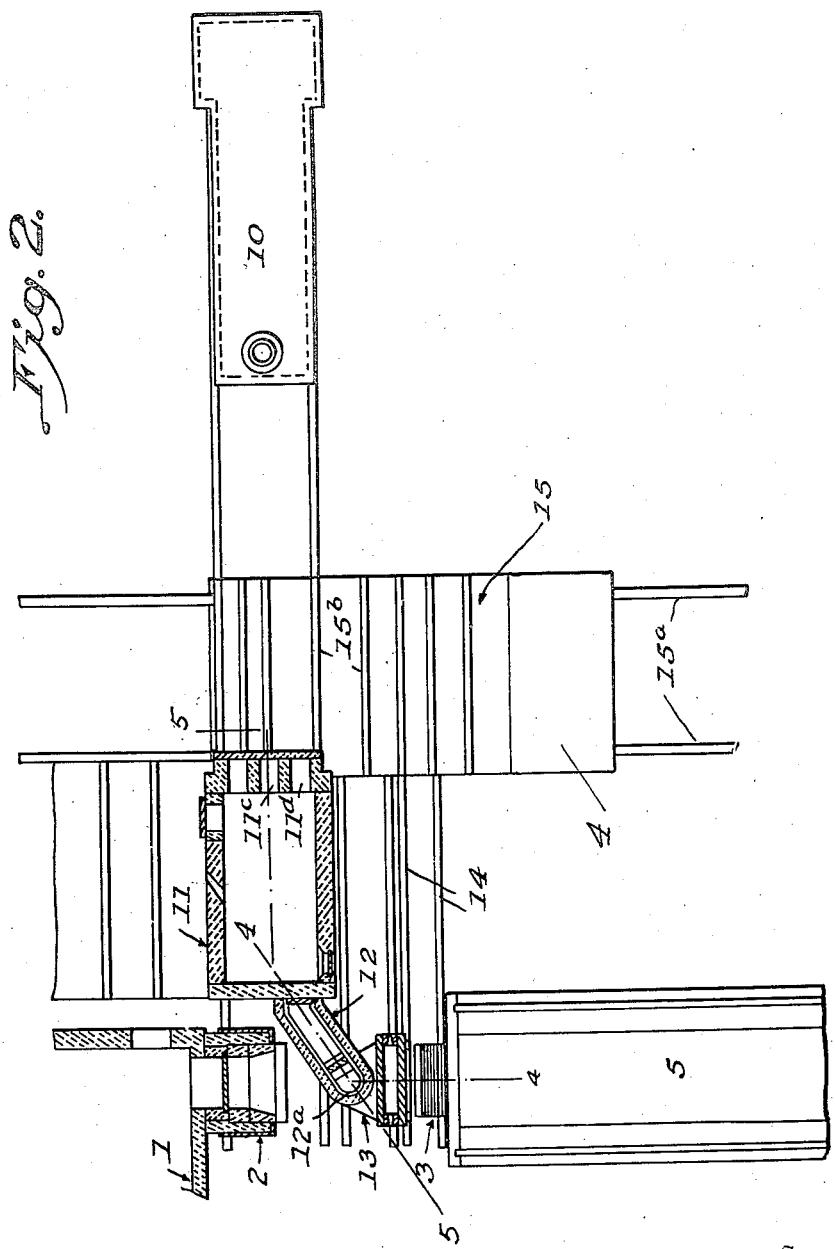

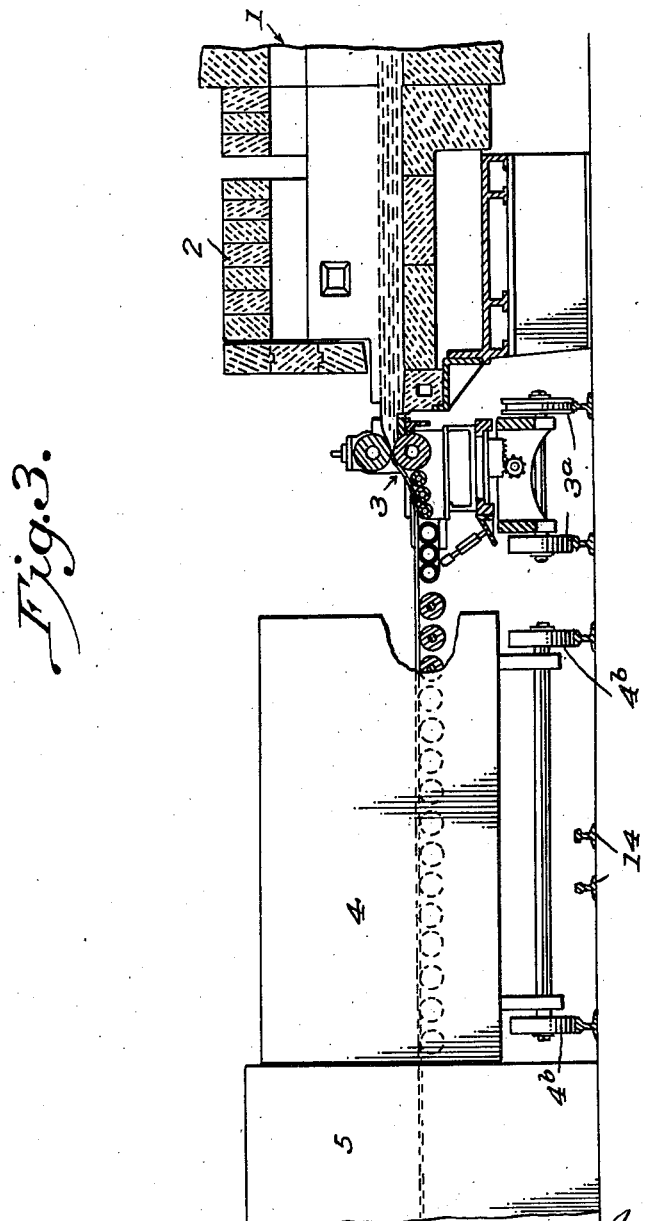

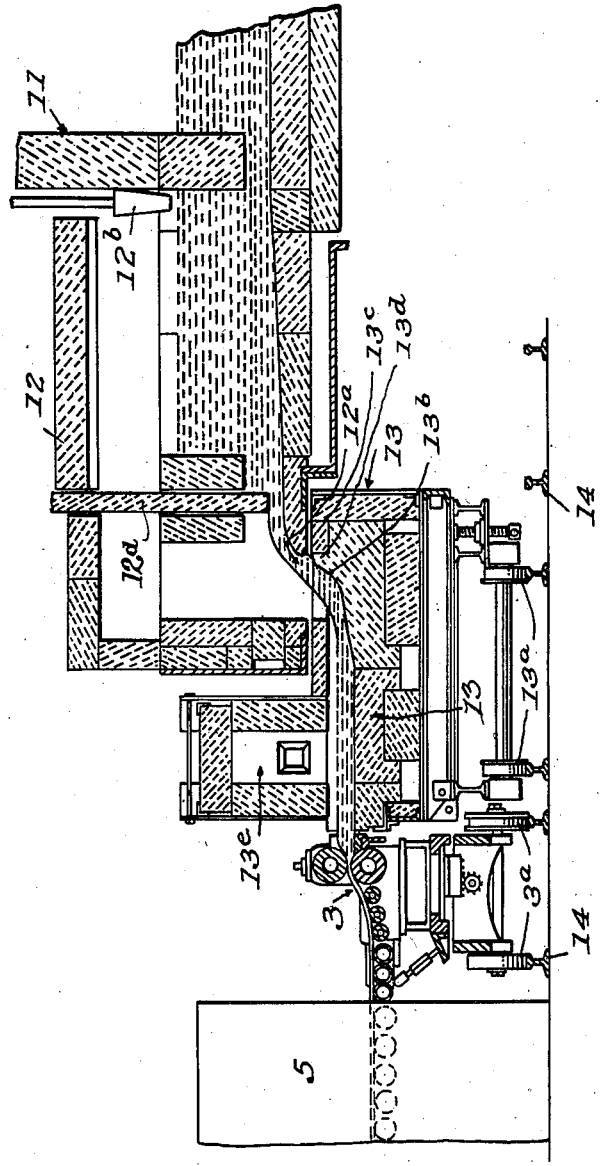

Patented Mar. 2, 1943

2,312,564

UNITED STATES PATENT OFFICE 2,312,564

APPARATUS FOR THE MANUFACTURE OF SHEET GLASS

Joseph H. Lewis, Kingsport, Tenn., assignor to Blue Ridge Glass Corporation, Kingsport, Tenn., a corporation of New York Application September 28, 1937, Serial No. 166,151

1 Claim. (Cl. 49—3)

A standard practice for the manufacture of flat glass in large quantities involves the melting of the glass in a continuous tank and the fabrication at a forming pass of the molten glass delivered thereby into a continuous ribbon, a number of feet in width and of the desired thickness, and the delivery of the ribbon from the pass to a continuous lehr, the furnace, the forming pass and the lehr being in a straight line. The lehr is necessarily of great length to obtain the proper thermal cycle and is expensive and the tank that it may deliver the necessary amount of properly refined and melted glass is very large. It is often desired, however, to melt special glasses in quantities less than that justifying the use of the continuous tank, and for this purpose the so-called day tank is used. The handling of the sheets produced by the day tank, however, presents a problem in that they must be annealed, and if a continuous ribbon is to be fabricated such a procedure demands a lehr in alignment with the delivery from the forming pass.

My invention has for its object to provide means whereby the lehr which normally receives the glass ribbon from a continuous tank may when desired receive the ribbon from a day tank in lieu of that from the continuous tank. This I accomplish by placing in the conveyors from the forming machine of the continuous tank a movable section which may be replaced by a forehearth and a forming machine of the day tank and by providing a movable day tank which may be shifted in position so that it is alternately in operative communication with a fuel feeding system and in a position where its discharge spout will feed the movable forehearth.

For its purpose my invention comprises the arrangement, construction and combination of parts of which it is composed as will be hereinafter described and claimed.

Referring to the accompanying drawings in which corresponding parts are designated by corresponding marks of reference:

Figure 1 is a plan view of a plant embodying my invention the several instrumentalities being in a position for the manufacturing of glass melted in the continuous tank, and for the melting of glass in the day tank, Figure 2 is a similar view with the instrumentalities arranged for the manufacture of glass supplied from the day tank, Figures 3 and 4 are vertical sections taken on the lines $x3$—$x3$ and $x4$—$x4$ of Figures 1 and 2 respectively, and Figure 5 is a section on the line $x5$—$x5$ of Figure 2.

Figure 6 is a section on the line $x6$—$x6$ of Figure 5.

In the following the terms "front" and "rear" will be used with reference to the direction the glass feeds, the delivery end of the conveyor system being thus the front end of the system.

The continuous tank 1 a part of which is shown in Figure 1, may be of any approved design, it having a forehearth 2 delivering in the assemblage of Figure 1 molten glass to the sheet forming mechanism 3, which may comprise the conventional upper and lower rolls having a sheet forming pass between them. Also in the assemblage of Figure 1, in line with the sheet forming mechanism is a conveyor system made up of a roller table comprising a shiftable section 4 and a fixed section 5. The section 5 is and the section 4 may be enclosed to form a lehr of proper length to anneal the continuous sheet rolled at the forming pass. Such an assemblage, except for the movable section 4 is well known. Also in Figure 1 is shown the recuperator 10 beneath which is the day tank 11 with its delivery spout 12, these being to the right of the axis of the conveyor. Also is seen the forehearth 13 for the day tank.

Referring now to Figure 2, the movable conveyor section 4 has been shifted laterally, and the forming machine 3 has been placed against the rear end of the fixed section 5 of the conveyor. The special forehearth 13 has been placed behind the forming machine and the day tank has been shifted laterally so that its discharge spout delivers molten glass to the special forehearth.

To permit the shifts above referred to, the forming mechanism 3, the movable section 4 of the conveyor, the special forehearth 13 and the tank 11 are each mounted on suitable wheels 3a, 4b, 13a, and 11b, respectively, running on tracks 14 transverse to the line of the conveyor. A transfer table 15 is also provided and running on tracks 15a on the right of and parallel with the conveyor, the table having tracks 15b thereon registering with the transverse tracks 14, so that the several movable elements may be shifted longitudinally of the conveyor.

The day tank 11 is a general rectangular form having fuel induction and burnt gas eduction ports 11c and 11d respectively. From the forward end of the bottom of the tank projects the spout 12, the bottom of the outer end of which has a flow orifice 12a. A water cooled gate 12b closes the connection between the spout and the bottom of the tank during the melting of the glass in the tank, and the rate of flow of the glass through the orifice is controlled by a clay gate 12d. The front wall of the spout has an opening 12c therein which may be closed to permit the entrance of a bar to break the frozen glass.

The level of the spout is such that when it is projected with its orifice 12a in line with the axis of the conveyor, and the special forehearth is in operative position, it is immediately above the floor of the forehearth so that the glass delivered from the tank is not required to fall through air any substantial distance.

The special forehearth 13 has a channelled bottom 13b, sloped up rearwardly to the level of the upper surface of the top slab 13c, that covers the rear end thereof and which is apertured at 13d to register with the orifice 12a in the spout of the tank, this slope aiding in reducing the drop of the glass from the tank to the forehearth. The forward end of the channel in the bottom of the forehearth is covered over with blocks to form a combustion chamber 13e to condition the glass as it is delivered by the forehearth to the forming machine 3.

The day tank during period in which melting is taking place is run under the recuperator 10 mounted on an elevated frame work which has a downwardly projecting leg 16a at its rear, provided with ports 16b and 16c registering with the ports 11c and 11d in the rear of the day tank. The day tank and its forehearth and the movable section of the lehr are each provided with suitable burners for gaseous fuel which may be led thereto by flexible pipe connections.

With the parts in the position shown in Figure 1, when it is desired to form a sheet from glass melted in the day tank, the flow of glass to the forehearth of the main tank is stopped, the movable section of the conveyor is moved laterally out of line and is stored at any convenient point, the forming machine is shifted from its position in front of the forehearth in the fixed tank to a position immediately behind the section 5 of the lehr, and the special forehearth is shifted to a position behind the forming machine. The day tank is then moved away from its position in registration with the recuperator and in a position in which its spout is over the special forehearth, all as shown in Figure 2. The movements above described are rendered possible by the tracks and the transfer table.

A rolling or forming machine can be efficiently and continuously operated with a continuous tank to produce a continuous ribbon of glass since the glass level in the tank can be regulated and maintained by the addition of batch material from time to time to satisfy the demands of the forming machine during its operation. In using a day tank for continuous operation it is desirable to operate such tank in a manner that it will meet the demands of the rolling machine and furnish glass thereto at a substantially constant rate. Under these circumstances the day tank and a portion of its spout 12 will carry a substantial depth of glass, the rate of the delivery of the glass from the spout 12 being controlled by a regulation or adjustment of the gate 12d so as to deliver glass to the forehearth at a rate sufficient to maintain a substantially constant level therein to satisfy the speed of operation of the rolling machine. As an example of these conditions reference will be had to Figure 4 where the water gate 12b and gate 12d are shown raised with the glass flowing from the day tank to the forehearth 13 and thence through the forming pass of the sheet forming or rolling machine following which it is delivered by the latter to the fixed section of the conveyor.

Having thus described my invention, what I claim is:

The combination with a continuous glass sheet rolling machine and a lehr in line with the sheet rolling machine and receiving the continuous sheet therefrom, of a movable forehearth adapted to be inserted in the line, in the rear of the sheet forming mechanism, and of a movable furnace having a discharge spout, the flow of which into the forehearth is controlled by suitable gates, said furnace being adapted by its movement to have its discharge brought above the movable forehearth.

JOSEPH H. LEWIS.